United States Patent
Hucker et al.

(10) Patent No.: US 9,845,861 B1
(45) Date of Patent: Dec. 19, 2017

(54) ROTATABLE ASSEMBLY INCLUDING A COUPLING INTERFACE

(71) Applicant: GM GLOBAL TECHNOLOGY OPERATIONS LLC, Detroit, MI (US)

(72) Inventors: Scott A. Hucker, Ortonville, MI (US); Chris D. Hosler, Dryden, MI (US); Ronald B. Beals, South Lyon, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 15/165,604

(22) Filed: May 26, 2016

(51) Int. Cl.
| | | |
|---|---|---|
| *F16H 7/20* | (2006.01) | |
| *F16H 55/36* | (2006.01) | |
| *B25G 3/28* | (2006.01) | |
| *F16H 57/00* | (2012.01) | |
| *F16H 55/30* | (2006.01) | |
| *F16C 3/06* | (2006.01) | |

(52) U.S. Cl.
CPC ............ *F16H 57/0025* (2013.01); *F16C 3/06* (2013.01); *F16H 55/30* (2013.01); *F16H 2055/306* (2013.01)

(58) Field of Classification Search
CPC ........ F16D 2001/103; F16D 3/06; F16D 1/06; Y10T 403/7035; Y10T 403/7026
USPC .............................. 474/198; 403/359.1–359.6
See application file for complete search history.

(56) References Cited

U.S. PATENT DOCUMENTS

| | | | | |
|---|---|---|---|---|
| 177,337 | A * | 5/1876 | Johnson ..................... | 403/359.1 |
| 183,426 | A * | 10/1876 | Smith ........................ | 174/133 R |
| 390,615 | A * | 10/1888 | Nye ........................... | B63H 1/20 403/359.6 |
| 581,476 | A * | 4/1897 | Blanton, Jr. ........... | F16B 7/1427 403/345 |
| 611,556 | A * | 9/1898 | Blanton, Jr. ........... | F16D 1/0817 403/344 |
| 1,375,852 | A * | 4/1921 | Linendoll .............. | B21D 39/04 29/525 |
| 1,381,805 | A * | 6/1921 | Crewdson ................ | B04B 9/12 403/359.1 |
| 1,469,304 | A * | 10/1923 | Hughes ..................... | F16D 1/05 403/305 |
| 1,507,991 | A * | 9/1924 | Edwards ............... | E21B 17/046 285/330 |
| 1,511,910 | A * | 10/1924 | Royce ...................... | F16D 1/12 403/359.5 |
| 1,586,990 | A * | 6/1926 | Harrison .................. | F16C 3/02 403/359.6 |
| 1,636,262 | A * | 7/1927 | Troendly .................. | F16D 3/72 403/359.5 |
| 1,689,730 | A * | 10/1928 | Knight ..................... | F16H 3/22 403/359.5 |

(Continued)

*Primary Examiner* — Henry Liu
(74) *Attorney, Agent, or Firm* — Quinn IP Law

(57) ABSTRACT

A rotatable assembly, such as a crankshaft or camshaft assembly, includes a first rotatable component and a second rotatable component coupled to the first rotatable component. The first rotatable component includes a first body and defines a plurality of recesses extending into the first body. The second rotatable component includes a second body and defines a plurality of protrusions extending from the second body. The protrusions are disposed inside the respective recesses to allow the second rotatable component to rotate in unison with the first rotatable component.

8 Claims, 2 Drawing Sheets

(56) References Cited

U.S. PATENT DOCUMENTS

| | | | | |
|---|---|---|---|---|
| 1,779,805 A * | 10/1930 | Dunwoodie | F16D 1/08 | 29/525 |
| 1,861,640 A * | 6/1932 | McCabe | D06F 13/00 | 366/278 |
| 1,905,277 A * | 4/1933 | Ewert | B23F 5/22 | 403/254 |
| 1,905,278 A * | 4/1933 | Edgar | B23F 5/22 | 409/12 |
| 1,909,500 A * | 5/1933 | Ornitz | F16D 1/06 | 403/11 |
| 1,916,259 A * | 7/1933 | Ewert | B23F 21/16 | 407/23 |
| 2,015,430 A * | 9/1935 | Matthews | B23F 5/22 | 403/359.6 |
| 2,038,554 A * | 4/1936 | Edgar | F16D 1/092 | 403/359.5 |
| 2,056,688 A * | 10/1936 | Peterka | F16B 35/04 | 411/399 |
| RE20,270 E * | 2/1937 | Matthews et al. | F16D 3/06 | 403/359.6 |
| 2,083,092 A * | 6/1937 | Richer | B25B 15/005 | 411/403 |
| 2,089,168 A * | 8/1937 | Brown | F16D 1/0882 | 403/259 |
| 2,111,244 A * | 3/1938 | Hueglin | F16C 11/045 | 248/188.7 |
| 2,119,334 A * | 5/1938 | Leffler | F16D 1/08 | 29/432 |
| 2,164,643 A * | 7/1939 | Drader | B23F 15/00 | 409/12 |
| 2,259,460 A * | 10/1941 | Dexter | E21B 3/04 | 24/483 |
| 2,297,390 A * | 9/1942 | Burger | F16D 1/06 | 403/350 |
| 2,326,932 A * | 8/1943 | Drader | B23F 21/16 | 407/23 |
| 2,363,845 A * | 11/1944 | Duggan | B05B 15/045 | 118/505 |
| 2,430,683 A * | 11/1947 | O'Malley | F16D 3/20 | 403/301 |
| 2,440,775 A * | 5/1948 | Land | F16D 3/06 | 403/359.6 |
| 2,471,982 A * | 5/1949 | Shulda | F16C 3/12 | 403/359.6 |
| 2,508,832 A * | 5/1950 | McAninch | F16D 1/04 | 403/355 |
| 2,514,675 A * | 7/1950 | Shafter | B02C 2/005 | 241/293 |
| 2,652,271 A * | 9/1953 | Gaubatz | F01D 5/025 | 403/359.6 |
| 2,653,840 A * | 9/1953 | Bitzer | A01K 87/02 | 16/427 |
| 2,691,899 A * | 10/1954 | Brown | F16K 31/44 | 137/614.11 |
| 2,726,357 A * | 12/1955 | Sachs | H01L 23/041 | 257/692 |
| 2,733,943 A * | 2/1956 | Nater | E21B 10/445 | 175/323 |
| 2,765,529 A * | 10/1956 | Bolender | B24B 19/02 | 29/558 |
| 2,821,277 A * | 1/1958 | Hughes | F16D 11/10 | 192/114 R |
| 2,932,207 A * | 4/1960 | Whitney | F16H 55/30 | 403/362 |
| 2,969,250 A * | 1/1961 | Kull | B25B 13/065 | 403/345 |
| 3,237,469 A * | 3/1966 | Berry | F01L 1/02 | 403/230 |
| 3,290,918 A * | 12/1966 | Weasler | F16D 1/10 | 29/893.2 |
| 3,396,554 A * | 8/1968 | Westercamp | F16B 21/16 | 384/570 |
| 3,415,137 A * | 12/1968 | Casale | F01L 1/02 | 123/90.15 |
| 3,418,012 A * | 12/1968 | La Torre | F16B 4/004 | 29/525 |
| 3,477,250 A * | 11/1969 | Gregorich | F16D 23/06 | 192/53.2 |
| 3,487,903 A * | 1/1970 | Stickan | F16D 1/0876 | 192/107 R |
| 3,584,667 A * | 6/1971 | Reiland | B25B 13/065 | 411/402 |
| 3,608,936 A * | 9/1971 | Karden | F16B 21/12 | 403/316 |
| 3,621,945 A * | 11/1971 | Spry | F16D 55/36 | 188/218 XL |
| 3,805,552 A * | 4/1974 | Heald | F16C 29/02 | 376/285 |
| 3,832,076 A * | 8/1974 | Gehrke | F16B 21/18 | 403/359.5 |
| 3,836,272 A * | 9/1974 | Duer | F16D 1/09 | 403/359.5 |
| 3,838,929 A * | 10/1974 | Burrell | B60B 37/04 | 403/365 |
| 3,865,500 A * | 2/1975 | Newell | F16D 1/104 | 16/422 |
| 3,889,489 A * | 6/1975 | Casey | F16D 3/06 | 184/6.11 |
| 3,932,048 A * | 1/1976 | DuPont | F16B 12/40 | 403/225 |
| 3,992,117 A * | 11/1976 | Ristau | F16B 21/18 | 285/321 |
| 4,098,096 A * | 7/1978 | Chard | F16D 3/06 | 403/359.2 |
| 4,115,022 A * | 9/1978 | Orain | F16D 3/06 | 192/108 |
| 4,153,260 A * | 5/1979 | Joyner | F16D 3/06 | 277/500 |
| 4,165,195 A * | 8/1979 | Teramachi | F16C 29/0697 | 403/359.5 |
| 4,210,372 A * | 7/1980 | McGee | B60B 3/14 | 180/9.62 |
| 4,368,786 A * | 1/1983 | Cousins | E21B 4/04 | 175/61 |
| 4,376,333 A * | 3/1983 | Kanamaru | B21K 25/00 | 29/432 |
| 4,433,964 A * | 2/1984 | Holtzberg | F02B 67/06 | 123/90.31 |
| 4,437,782 A * | 3/1984 | Geisthoff | F16C 3/03 | 384/49 |
| 4,473,317 A * | 9/1984 | Bolang | F16D 3/06 | 403/359.2 |
| 4,552,544 A * | 11/1985 | Beckman | F16C 3/03 | 403/359.6 |
| 4,554,893 A * | 11/1985 | Vecellio | F02B 75/20 | 123/195 S |
| 4,572,291 A * | 2/1986 | Robison | E21B 37/02 | 166/173 |
| 4,581,957 A * | 4/1986 | Dossier | B25B 13/065 | 81/121.1 |
| 4,603,597 A * | 8/1986 | Onorati | F16D 1/06 | 403/326 |
| 4,667,530 A * | 5/1987 | Mettler | B62D 1/185 | 403/225 |
| 4,678,361 A * | 7/1987 | Steinkamper | B62D 1/192 | 403/359.2 |
| 4,685,823 A * | 8/1987 | Lopez | F16D 1/06 | 29/558 |
| 4,701,068 A * | 10/1987 | Andrews | F16D 3/00 | 403/359.5 |
| 4,807,351 A * | 2/1989 | Berg | B21D 26/14 | 29/419.2 |
| 4,838,832 A * | 6/1989 | Schmitt | F16D 1/06 | 403/359.6 |
| 4,842,483 A * | 6/1989 | Geary | B63H 23/34 | 416/2 |
| 4,889,521 A * | 12/1989 | Nagano | B62M 9/10 | 474/164 |

(56) References Cited

U.S. PATENT DOCUMENTS

| | | | | |
|---|---|---|---|---|
| 4,919,221 A * | 4/1990 | Pascale | E21B 10/36 | 173/132 |
| 4,938,731 A * | 7/1990 | Nguyen | B25B 13/065 | 403/14 |
| 5,019,080 A * | 5/1991 | Hemer | A61B 17/8615 | 411/402 |
| 5,165,881 A * | 11/1992 | Wicen | F01C 21/08 | 264/274 |
| 5,181,432 A * | 1/1993 | Allen | F01L 1/02 | 116/200 |
| 5,213,437 A * | 5/1993 | Sommer | F16D 1/06 | 403/298 |
| 5,370,587 A * | 12/1994 | Johnson | F16D 1/0858 | 474/166 |
| 5,427,580 A * | 6/1995 | Ledvina | F01L 1/02 | 474/84 |
| 5,460,574 A * | 10/1995 | Hobaugh | F16C 3/03 | 403/359.2 |
| 5,469,958 A * | 11/1995 | Gruettner | B65G 23/06 | 198/834 |
| 5,480,357 A * | 1/1996 | Liang | B62M 9/10 | 474/160 |
| 5,503,494 A * | 4/1996 | Kamata | F16D 1/0858 | 403/359.6 |
| 5,538,355 A * | 7/1996 | Burr | F04C 15/0076 | 403/355 |
| 5,569,107 A * | 10/1996 | Mu | B62M 9/10 | 474/160 |
| 5,647,683 A * | 7/1997 | Easley | B60B 27/001 | 403/267 |
| 5,653,764 A * | 8/1997 | Murphy | A61F 2/3609 | 623/23.15 |
| 5,664,655 A * | 9/1997 | Oh | F16D 3/06 | 192/70.2 |
| 5,690,568 A * | 11/1997 | Watson | B22F 7/062 | 474/152 |
| D396,436 S * | 7/1998 | Liska | D12/123 | |
| 5,785,357 A * | 7/1998 | Foster | F16L 15/08 | 285/322 |
| 5,816,968 A * | 10/1998 | Watson | B22F 7/062 | 474/152 |
| 5,903,965 A * | 5/1999 | Fletcher | B29C 41/14 | 264/134 |
| 5,911,283 A * | 6/1999 | Cousins | E21B 7/061 | 175/78 |
| 5,980,406 A * | 11/1999 | Mott | F16H 7/06 | 474/152 |
| 5,987,287 A * | 11/1999 | Huang | G03G 15/0867 | 399/107 |
| 6,059,378 A * | 5/2000 | Dougherty | B21K 25/00 | 301/124.1 |
| 6,059,480 A * | 5/2000 | Maughan | F16C 11/0609 | 403/122 |
| 6,101,907 A * | 8/2000 | McGovern | B25B 13/461 | 81/177.8 |
| 6,149,526 A * | 11/2000 | Boersma | B62D 1/185 | 403/225 |
| 6,238,133 B1 * | 5/2001 | DeRoche | B23C 5/2221 | 403/359.1 |
| 6,267,701 B1 * | 7/2001 | Mott | F01L 1/022 | 474/148 |
| 6,279,221 B1 * | 8/2001 | Glowacki | F16C 3/03 | 29/428 |
| 6,381,933 B1 * | 5/2002 | Wanner | F16D 1/05 | 403/154 |
| 6,405,835 B1 * | 6/2002 | Satou | B60T 1/065 | 188/170 |
| 6,413,180 B1 * | 7/2002 | Kanehira | B60K 17/344 | 474/148 |
| 6,416,245 B1 * | 7/2002 | Matt | F16D 1/072 | 403/282 |
| 6,470,560 B1 * | 10/2002 | Wanner | F16D 1/05 | 29/282 |
| 6,547,479 B2 * | 4/2003 | Dowling, Jr. | F16D 1/06 | 403/359.1 |
| 6,604,885 B1 * | 8/2003 | Neuner | F16D 1/06 | 29/889.22 |
| 6,623,202 B2 * | 9/2003 | Hansson | B23B 31/008 | 403/257 |
| 6,698,076 B2 * | 3/2004 | Brissette | F16C 3/03 | 29/421.1 |
| 6,705,949 B2 * | 3/2004 | Glowacki | F16D 1/02 | 403/359.1 |
| 6,725,004 B2 * | 4/2004 | Ahn | G03G 15/757 | 399/117 |
| 6,736,580 B2 * | 5/2004 | Schultz | B25B 13/065 | 411/403 |
| 6,754,943 B1 * | 6/2004 | Perry | B23P 11/00 | 29/421.1 |
| 6,761,503 B2 * | 7/2004 | Breese | F16C 3/035 | 384/49 |
| 6,979,144 B2 * | 12/2005 | Iwasaki | G02B 7/022 | 359/822 |
| 7,044,860 B2 * | 5/2006 | Smith | F16C 3/03 | 403/109.5 |
| 7,178,786 B2 * | 2/2007 | Turnau, III | F16K 31/60 | 251/309 |
| 7,188,711 B2 * | 3/2007 | Gripemark | F16D 65/12 | 188/18 A |
| 7,220,083 B2 * | 5/2007 | Festeau | B23C 5/202 | 407/113 |
| 7,225,710 B2 * | 6/2007 | Pacheco, Jr. | B25B 13/065 | 411/403 |
| 7,255,481 B2 * | 8/2007 | Mermoud | B60B 27/00 | 152/417 |
| 7,331,743 B2 * | 2/2008 | Schultz | B25B 13/065 | 411/403 |
| 7,331,744 B2 * | 2/2008 | Schultz | B25B 13/065 | 411/403 |
| 7,568,872 B2 * | 8/2009 | Schultz | B25B 13/065 | 411/403 |
| 7,599,645 B2 * | 10/2009 | Hara | G03G 15/757 | 399/167 |
| 7,682,257 B2 * | 3/2010 | Disser | F16D 1/0858 | 403/359.6 |
| 7,810,586 B2 * | 10/2010 | Cousins | E21B 17/046 | 175/101 |
| 7,946,924 B2 * | 5/2011 | Neugebauer | F16C 3/03 | 403/359.6 |
| 7,955,020 B2 * | 6/2011 | Deriaz | F16D 1/101 | 403/359.6 |
| 7,998,007 B2 * | 8/2011 | Mehta | F16H 7/06 | 474/148 |
| 8,042,481 B2 * | 10/2011 | Iwakami | B63H 11/113 | 114/144 R |
| 8,133,142 B2 * | 3/2012 | Gerlich | F16D 1/108 | 474/153 |
| 8,162,572 B2 * | 4/2012 | Festeau | B23C 5/202 | 407/113 |
| 8,202,043 B2 * | 6/2012 | McCaffrey | F01D 17/162 | 415/160 |
| 8,286,524 B2 * | 10/2012 | Tang | F16D 1/116 | 74/411 |
| 8,313,067 B2 * | 11/2012 | Knieriem | F16M 11/42 | 248/129 |
| 8,388,455 B2 * | 3/2013 | Eltner | F16D 3/06 | 464/16 |
| 8,540,582 B2 * | 9/2013 | Ozawa | B60B 27/00 | 384/544 |
| 8,545,125 B2 * | 10/2013 | Brown | F16D 1/101 | 403/359.1 |
| 8,545,156 B2 * | 10/2013 | Kageyama | B25B 15/005 | 411/402 |
| 8,555,838 B2 * | 10/2013 | Petry-Johnson | B60K 25/02 | 123/90.31 |
| 8,678,637 B2 * | 3/2014 | Dietz | B29C 47/64 | 366/79 |

(56) References Cited

U.S. PATENT DOCUMENTS

| | | | |
|---|---|---|---|
| 8,708,611 B2* | 4/2014 | Marshansky | B23C 5/1054 |
| | | | 407/47 |
| 9,010,215 B2* | 4/2015 | Rietzler | B29C 59/043 |
| | | | 184/5 |
| 9,114,463 B2* | 8/2015 | Dufour | B23C 5/06 |
| 9,261,127 B2* | 2/2016 | Buhl | B23G 9/002 |
| 9,446,460 B2* | 9/2016 | Festeau | B23C 5/202 |
| 9,458,871 B2* | 10/2016 | Ishizaki | B62D 1/20 |
| 9,476,495 B2* | 10/2016 | Blackmur | F16H 55/30 |
| 9,562,557 B2* | 2/2017 | Ross | B21K 1/463 |
| 2002/0110415 A1* | 8/2002 | Dowling, Jr. | F16D 1/06 |
| | | | 403/359.1 |
| 2003/0078670 A1* | 4/2003 | Grimes | A61F 2/3601 |
| | | | 623/23.21 |
| 2005/0221936 A1* | 10/2005 | Seki | B60G 3/24 |
| | | | 474/144 |
| 2007/0104535 A1* | 5/2007 | Valovick | F16C 3/03 |
| | | | 403/359.1 |
| 2007/0147966 A1* | 6/2007 | Emoto | B23C 3/06 |
| | | | 407/66 |
| 2008/0277247 A1* | 11/2008 | Eubanks | B65G 13/07 |
| | | | 198/789 |
| 2015/0276038 A1* | 10/2015 | Blackmur | F16H 55/30 |
| | | | 474/152 |

\* cited by examiner

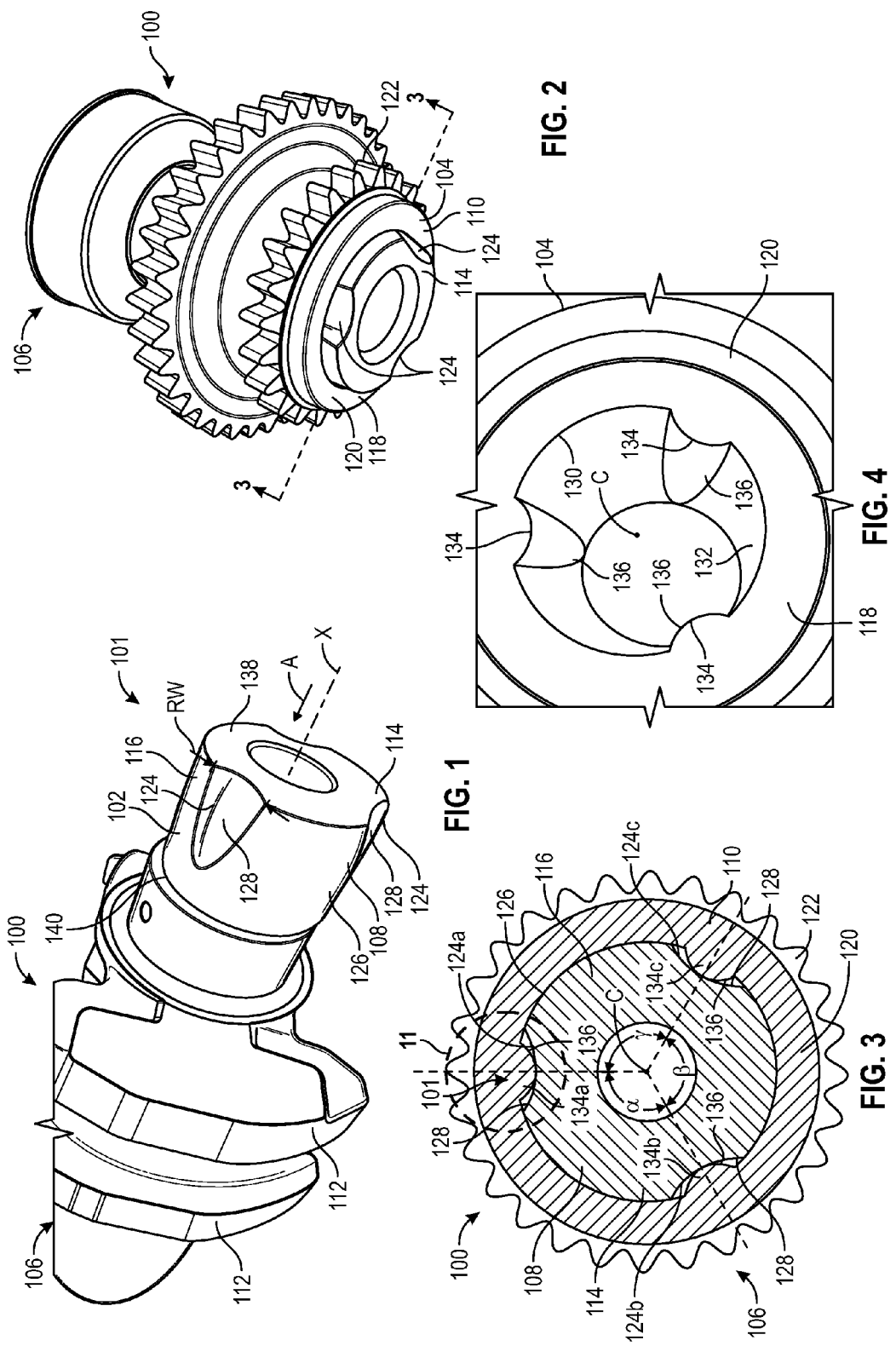

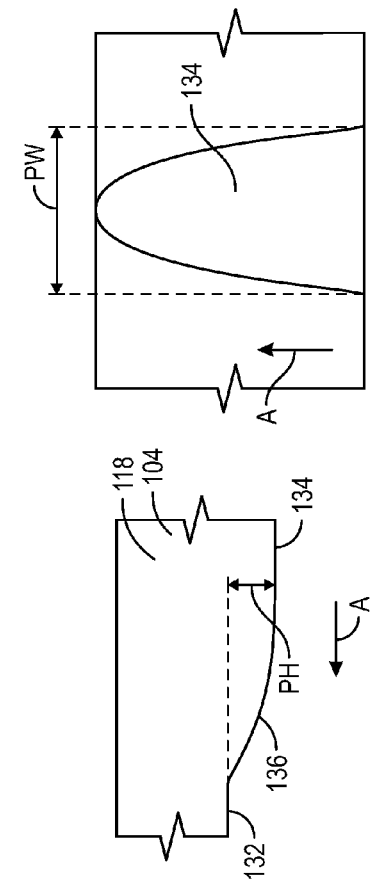
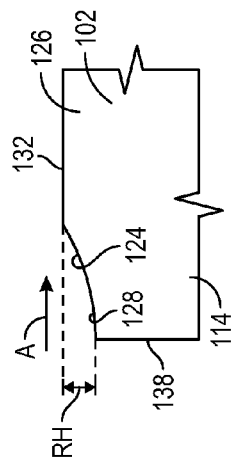
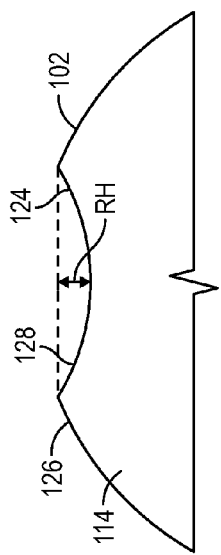
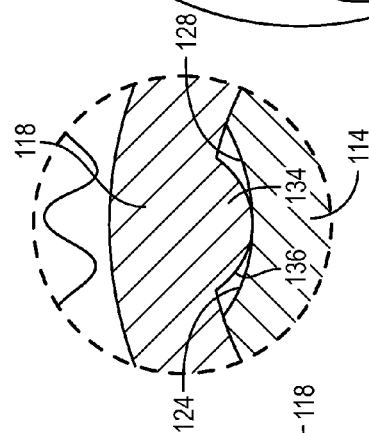
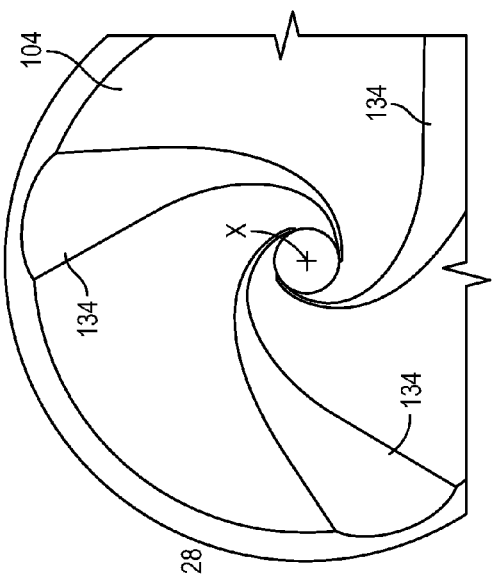
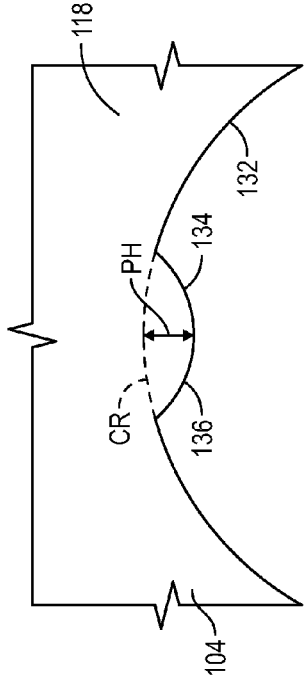

ROTATABLE ASSEMBLY INCLUDING A COUPLING INTERFACE

TECHNICAL FIELD

The present disclosure relates to a rotatable assembly, such as a crankshaft assembly, including a coupling interface.

BACKGROUND

Mechanical devices, such as internal combustion engines, include rotatable components for different purposes. For instance, internal combustion engines include at least one crankshaft. A crankshaft converts reciprocating linear movement of a piston into rotational movement about an axis to provide torque to propel a vehicle, such as but not limited to a train, a boat, a plane, or an automobile, or to drive any other apparatus powered by the engine.

SUMMARY

The present disclosure relates to a rotatable assembly, such as a crankshaft assembly, including a coupling interface. The presently disclosed coupling interface can be mass-produced and manufactured in a cost-effective manner. This coupling interface may be incorporated into automobiles, agricultural equipment, home appliance, etc. In certain embodiments, the coupling interface includes recesses and protrusions configured to mate with each other in order to couple different components of the rotatable assembly. As a non-limiting example, a first rotatable component of a rotatable assembly includes a first body and defines a plurality of recesses extending into the first body. A second rotatable component of the rotatable assembly includes a second body and defines a plurality of protrusions extending from the second body. The protrusions are disposed inside the recesses to allow the second rotatable component to rotate in unison with the first rotatable component. The recesses can be formed using a machining or forming process, and the protrusions can be formed by using powder metal manufacturing processes, by attaching metal dowels to the second body, or by directly machining the second rotatable component.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 1 is a schematic perspective, fragmentary view of a rotatable assembly including a post with circumferentially spaced recesses.

FIG. 2 is a schematic perspective, fragmentary view of the rotatable assembly shown in FIG. 1, illustrating a sprocket disposed over the post.

FIG. 3 is a schematic, cross-sectional front view of the rotatable assembly shown in FIG. 2.

FIG. 4 is a schematic perspective, fragmentary view of the sprocket, illustrating an inner sprocket surface and protrusions of the sprocket.

FIG. 5 is a schematic, fragmentary front view of a recess of the rotatable assembly shown in FIG. 1.

FIG. 6 is a schematic, fragmentary side view of a recess of the rotatable assembly shown in FIG. 1.

FIG. 7 is a schematic, fragmentary front view of a protrusion of the sprocket shown in FIG. 4.

FIG. 8 is a schematic, fragmentary side view of a protrusion of the sprocket shown in FIG. 4;

FIG. 9 is a schematic, fragmentary top view of inner view of the sprocket shown in FIG. 4, illustrating the protrusions; and FIG. 10 is a schematic, fragmentary view of the sprocket, illustrating an inner sprocket surface and curved protrusions of the sprocket.

FIG. 11 is a schematic, enlarged fragmentary view of the rotatable assembly shown in FIG. 2, taken around area 11 in FIG. 3.

DETAILED DESCRIPTION

Referring to the drawings, wherein like reference numbers correspond to like or similar components throughout the several figures, and beginning with FIGS. 1-4, a rotatable assembly 100 is configured to rotate about a longitudinal axis X. In the depicted embodiment, the rotatable assembly 100 includes a coupling interface 101 for connecting a first rotatable component 102 to a second rotatable component 104. The coupling interface 101 allows the first rotatable component 102 and the second rotatable component 104 to rotate in unison about the longitudinal axis X. However, the coupling interface 101 does not allow relative rotation between the first rotatable component 102 and the second rotatable 104 component across the coupling interface 101. The coupling interface 101 allows torque transmission between the first rotatable component 102 and the second rotatable component 104. In other words, due to the coupling interface 101, torque can be transmitted between the first rotatable component 102 and the second rotatable component 104. This torque transmission does not require a clamp load.

The rotatable assembly 100 may be, for example, configured as a crankshaft assembly 106. In such a case, the first rotatable component 102 is configured as a shaft 108 (FIG. 1), and the second rotatable component 104 is configured as a sprocket 110 (FIG. 2). In addition to the sprocket 110 and the shaft 108, the crankshaft assembly 106 includes a plurality of counterweights 112 coupled to the shaft 108. Regardless of their respective configuration, the first rotatable component 102 and the second rotatable component 104 both extend along the longitudinal axis X. Accordingly, the first rotatable component 102 and the second rotatable component 104 can rotate about the longitudinal axis X and are coaxial with respect to each other.

The first rotatable component 102 includes a first body 114, and the second rotatable component 104 includes a second body 118. In the crankshaft assembly 106, the first body 114 is configured as a post 116, and the second body 118 is configured as a ring 120. In addition to the ring 120, the sprocket 110 includes a plurality of teeth 122 coupled to the ring 120. Specifically, the teeth 122 are annularly arranged about the ring 120.

The first rotatable component 102 defines a plurality of recesses 124 extending into the first body 114. The recesses 124 are part of the coupling interface and can be manufactured using grinding processes or any other suitable machining process. Specifically, the first body 114 defines circumferential outer body surface 126 and a plurality of concave surfaces 128 each defining one of the recesses 124. The concave surfaces 128 may have a substantially semi-elliptical cross-sectional shape in order to facilitate the connection between the first rotatable component 102 and the second rotatable component 104. As such, the recesses 124 may have a substantially scalloped shaped configuration. The substantially scalloped shaped configuration of the recesses 124 enhances the connection between the first rotatable component 102 and the second rotatable component 104 while allowing the second rotatable component 104 to easily slide over the first rotatable component 102 for assembly. As a non-limiting example, the first body 114 defines three concave surfaces 128 circumferentially spaced apart from one another. However, it is contemplated that the first body 114 may define any plurality of concave surfaces 128 and recesses 124. In the depicted non-limiting example, the first rotatable component 102 defines three recesses 124 circumferentially spaced apart from one another in order to ensure a proper alignment and connection with the second rotatable component 104 especially when the rotatable assembly 100 rotates about the longitudinal axis X.

The second rotatable component 104 defines an inner body opening 130 extending through the second body 118. The body opening 130 is configured, shaped, and sized to receive the first body 114. In particular, the second body 118 has a circumferential inner surface 132 defining the body opening 130. In the example, the second body 118 includes three protrusions 134 extending from the circumferential inner surface 132 toward a center C of the body opening 130. The protrusions 134 may be formed by machining (e.g., grinding) the second rotatable component 104. Alternatively, the protrusions 134 may be formed in powdered metal in order to minimize cost. Irrespective of the manufacturing process employed, each protrusion 134 is configured, shaped, and sized to mate with one of the recesses 124 of the first rotatable component 102. In other words, each of the protrusions 134 mates with one of the recesses 124, such that the first rotatable component 102 is prevented from rotating relative to the second rotatable component 104 while allowing the second rotatable component 104 to be slid over the first rotatable component 102. The recess 124 and the protrusion 134 jointly define the coupling interface 101. The tapered, conformal contact between the protrusion 134 and the recess 124 creates a unique lateral final resting position when the second rotatable component 104 is slide onto the first rotatable component 102. Thus, when the first rotatable component 102 and the second rotatable component 104 are combined, the lateral relationship between the first rotatable component 102 and the second rotatable component 104 fixed and defined by their geometry. When used provide defined lateral alignment without requiring limited radial alignment or torque transmission, the rotatable assembly 100 may include one or more protrusions 134 and one or more recesses 124.

Accordingly, when the protrusions 134 are disposed inside of the recesses 124, the first rotatable component 102 is coupled to the second rotatable component 104, thereby allowing the second rotatable component 104 to rotate in unison with the first rotatable component 102. The second body 118 includes convex surfaces 136 extending from the circumferential inner surface 132. The convex surfaces 136 may also be referred as raised surfaces and can be formed by using powder metal manufacturing processes, by attaching dowels to the second body, or by directly machining the second rotatable component 104. Moreover, the convex surfaces 136 at least partially define the protrusions 134 and are therefore circumferentially spaced apart from one another. The convex surfaces 136 may have a substantially semi-elliptical cross-sectional shape in order to facilitate the connection between the first rotatable component 102 and the second rotatable component 104 when the protrusions 134 are disposed inside the recesses 124. As such, the protrusions 134 may have a substantially scalloped shaped configuration in order to mate with the recesses 124 having the substantially scalloped shaped configuration. The substantially scalloped shaped configuration of the recesses 124 and the protrusions 134 allows the second body 118 to be slid over the first body 114 during assembly while rotatably coupling the first rotatable component 102 to the second rotatable component 104. It is contemplated that the convex surfaces 136 may have other suitable shapes. As non-limiting examples, the convex surfaces 136 and the concave surfaces 128 may have variable radius. The particular radius of the convex surfaces 136 and the concave surfaces 128 may be determined based on the maximum allowable stress and the accuracy required. In summary, the radius and form of the protrusion 134 and recess 124 can be adjusted as desired to limit the contact stresses appropriate for the materials being considered. Regardless of its particular shape, the convex surfaces 136 are in direct contact with the concave surfaces 128 when the protrusions 134 are disposed inside of the recesses 124, thereby enhancing the connection between the first rotatable component 102 and the second rotatable component 104. The second rotatable component 104 surrounds the first rotatable component 102, such that the protrusions 134 are in direct contact with the concave surfaces 128. As a non-limiting example, the second rotatable component 104 includes three protrusions 134 circumferentially spaced apart from one another in order to ensure a proper alignment and connection with the first rotatable component 102 especially when the rotatable assembly 100 rotates about the longitudinal axis X. However, it is contemplated that the second rotatable component 104 may include any plurality of protrusions 134.

With specific reference to FIG. 3, the recesses 124 are not equally spaced from one another, and the corresponding protrusions 134 are not equally spaced from one another such that the first rotatable component 102 and the second rotatable component 104 can be assembled only a single orientation for error proofing. If error proofing orientation is not required, then the spacing may be equal. In the depicted embodiment, for example, the recesses 124 include a first recess 124a, a second recess 124b, and a third recess 124c, and the protrusions 134 include a first protrusion 134a, a second protrusion 134b, and a third protrusion 134c. The angle between the first recess 124a and the second recess 124b is defined by a first angle $\alpha$. The first angle $\alpha$ also represents the angle between the first protrusion 134a and the second protrusion 134b. The angle between the second recess 124b and the third recess 124c is defined by a second angle $\beta$. The second angle $\beta$ also represents the angle between the second protrusion 134b and the third protrusion 134c. The angle between the third recess 124c and the first recess 124a is defined by a third angle $\gamma$. The third angle $\gamma$ also represents the angle between the third protrusion 134c and the first protrusion 134a. At least two of the first angle $\alpha$, the second angle $\beta$, and the third angle $\gamma$ are different to ensure that the first rotatable component 102 is properly aligned with the second rotatable component 104 during assembly. For example, the first angle $\alpha$ and the second angle $\beta$ may be equal to each other but each may be different from the third angle $\gamma$. It is contemplated, the first angle $\alpha$, the second angle $\beta$, and the third angle $\gamma$ may all be different from each other in order to further minimize the risk of misalignment between the first rotatable component 102 and the second rotatable component 104.

As shown in FIG. 11, the radius of the protrusion 134 is slightly smaller than the radius of the recess 124. As such, the protrusion 134 is in conformal contact with the recess 124 to allow the coupling interface 101 to carry torque through the rotatable assembly 100. The protrusion 134 is in tapered, conformal contact with the recess 124 to create a joint with minimized runout of the second rotatable component 104 from the first rotatable component 102. Additional protrusions 134 and recesses 124 decrease the runout. The tapered, conformal contact between the protrusion 134 and the recess 124 creates a unique lateral final resting position when the second rotatable component 104 is slide onto the first rotatable component 102.

With reference to FIGS. 1, 5, and 6, each recess 124 has a recess height RH that is defined as the maximum distance from the concave surfaces 128 to the circumferential inner surface 132. Further, each protrusion 134 may have a tapered configuration in order to facilitate sliding the second rotatable component 104 over the first rotatable component 102. In particular, the protrusion height PH continuously decreases in an axial direction A, which is a direction from the outer post end 138 toward the inner post end 140. As a non-limiting example, the recess height RH of each recess 124 decreases exponentially in the axial direction A in order to facilitate sliding the second rotatable component 104 over the first rotatable component 102. In the present disclosure, the term "exponentially" means that the rate of change must be expressed using exponents. Each recess 124 is also tapered such that the recess width RW (FIG. 1) continuously decreases in the axial direction A. The recess width RW may decrease exponentially in the axial direction in order to facilitate sliding the second rotatable component 104 over the first rotatable component 102. In other non-limiting examples, the recess height RH of each recess 124 may experience a quadratic or cubic spline decrease in the axial direction A.

With reference to FIGS. 4, 7, 8, and 9, each protrusion 134 has a protrusion height PH that is defined as the distance from the convex surface 136 to a circumference CR (FIG. 7) of the circumferential inner surface 132. Further, each protrusion 134 may have a tapered configuration in order to facilitate sliding the second rotatable component 104 over the first rotatable component 102. In particular, the protrusion height PH continuously decreases in the axial direction A. In the depicted embodiment, the protrusion height PH of each protrusion 134 decreases exponentially in the axial direction A in order to facilitate sliding the second rotatable component 104 over the first rotatable component 102. Each protrusion 134 is also tapered such that the protrusion width PW (FIG. 9) continuously decreases in the axial direction A. As a non-limiting example, the protrusion width PW may decrease exponentially in the axial direction A in order to facilitate sliding the second rotatable component 104 over the first rotatable component 102. In other non-limiting examples, the protrusion width PW may experience a quadratic or cubic spline decrease in the axial direction A.

With reference to FIG. 10, the protrusions 134 may have a curved configuration about the longitudinal axis X (FIG. 1) instead of being linear. In this embodiment, the recesses 124 also have a curved configuration in order to mate with the protrusions 134, thereby enhancing the connection between the first rotatable component 102 and the second rotatable component 104. The spiral can be oriented to provide a self-tightening impact as a result of the direction of rotation of the part while in service.

While the best modes for carrying out the teachings have been described in detail, those familiar with the art to which this disclosure relates will recognize various alternative designs and embodiments for practicing the teachings within the scope of the appended claims. The rotatable assembly illustratively disclosed herein may be suitably practiced in the absence of any element which is not specifically disclosed herein.

The invention claimed is:

1. A rotatable assembly, comprising:
   a first rotatable component including a first body and defining a plurality of recesses extending into the first body;
   a second rotatable component including a second body and defining a plurality of protrusions extending from the second body, wherein the protrusions are disposed inside the recesses such as to allow the second rotatable component to rotate in unison with the first rotatable component; and
   wherein the recesses are not equally spaced from one another, and the protrusions not equally spaced from one another such that the first rotatable component and the second rotatable component are configured to be assembled together in only a single orientation relative to each other, the recesses include a first recess, a second recess, and a third recess, and the protrusions include a first protrusion, a second protrusion, and a third protrusion, a first angle is defined from the first recess to the second recess, a second angle is defined from the second recess to third recess, a third angle is defined from the third recess to the first recess, the first angle, the second angle, and the third angle are all be different from each other, the first rotatable component extends along a longitudinal axis, and each of the recesses has a recess width and a tapered configuration such that the recess width of each of the recesses continuously decreases in an axial direction, the recess width of each of the recesses decreases exponentially in the axial direction, each of the recesses has a recess height, and the recess height of each of the recesses decreases exponentially in the axial direction, each of the protrusions has a protrusion width and a tapered configuration such that the protrusion width continuously decreases in the axial direction, the protrusion width of each of the protrusions decreases exponentially in the axial direction, and each of the protrusions has a protrusion height that decreases exponentially in the axial direction.

2. The rotatable assembly of claim 1, wherein the plurality of protrusions defines a coupling interface, and the coupling interface does not allow relative rotation between the first rotatable component and the second rotatable component across the coupling interface.

3. The rotatable assembly of claim 1, wherein each of the plurality of protrusions is in tapered, conformal contact with the plurality of recesses to create a joint with minimized runout of the second rotatable component from the first rotatable component.

4. The rotatable assembly of claim 3, wherein the tapered, conformal contact creates a unique lateral final resting position when the second rotatable component is slid onto the first rotatable component.

5. The rotatable assembly of claim 1, wherein the recesses and protrusions define a coupling interface to allow torque transmission between the first rotatable component and the second rotatable component.

6. The rotatable assembly of claim 5, wherein the torque transmission does not require a clamp load.

7. The rotatable assembly of claim 1, wherein a radius and form of the protrusions and recesses are configured to limit contact stress.

8. The rotatable assembly of claim 1, wherein each of the protrusions mates with each of the recesses such that first rotatable component is prevented from rotating relative to the second rotatable component while allowing the second rotatable component to be slid over the first rotatable component.

* * * * *